United States Patent Office 3,453,183
Patented July 1, 1969

3,453,183
METHOD OF PURIFYING ETHANOLAMINES
Tadashi Okubo and Minoru Saotome, Kawasaki-shi, Japan, assignors to Nippon Shokubai Kagaku Kogyo Co., Ltd., Osaka, Japan, a corporation of Japan
No Drawing. Filed Dec. 20, 1965, Ser. No. 515,160
Claims priority, application Japan, Dec. 29, 1964, 39/74,247
Int. Cl. B01d 3/34, 3/10
U.S. Cl. 203—33      17 Claims

ABSTRACT OF THE DISCLOSURE

A method of purifying ethanol amines, e.g. triethanol amines, comprising forming a mixture of the crude ethanol amine with a material selected from powdered silicas, powdered silicates, liquid silicates, and powdered aluminas in an amount of at least 0.1% by weight and subsequently subjecting the mixture of the materials to vacuum distillation. Such a process allows for the removal of aldehyde impurities, presumably through the catalytic action of the added compounds present during vacuum distillation.

---

This invention relates to a method of purifying ethanolamines. More particularly, the invention relates to a method of obtaining substantially colorless and transparent ethanolamines having no offensive odor by the vacuum distillation of under ethanolamines in the presence of either powdered silicas, powdered silicates, liquid silicates or powdered aluminas.

Ethanolamines, which are prepared by reacting ethylene oxide with ammonia aqueous solution, are usually purified by a method such as follows. Namely, after separating the unreacted ammonia and a major portion of the water from the reaction product, the resulting crude ethanolamines mixture containing mono-, dis- and triethanolamine is vacuum distilled. The vacuum distillation operation is carried out by first delivering the crude ethanolamines mixture to a first distillation column where the monoethanolamine is separated, after which the bottom liquid is delivered to a second distillation column where the diethanolamine is separated, and thereafter the bottom liquid is delivered to a third distillation column where the triethanolamine is separated. The ethanolamines purified by this method however are accompanied by discoloration and an offensive odor, this tendency being especially pronounced in the case of triethanolamine such that its Hazen number reaches as high as above 60.

Although numerous causes for this discoloration and offensive odor of the ethanolamines purified by the conventional methods are conceivable, it is believed that this is in all likelihood due to the effects of aldehydes, such as acetaldehyde, and other impurities contained in the starting material ethylene oxide. In fact, if the material ethylene oxide is purified and the aldehyde content is reduced, the discoloration and offensive odor can be prevented to a certain extent. But since there is a limit in the extent to which the material ethylene oxide can be purified, as a practical matter it is very difficult to obtain colorless and transparent ethanolamines having no offensive odor.

A primary object of the present invention is to provide a purification method whereby substantially colorless and transparent ethanolamines having no offensive odor can be readily obtained from crude ethanolamines.

Another object of the invention is to provide a method of fractionating from a crude ethanolamines mixture (a mixture containing at least two of either crude mono-, di- or triethanolamine) the respective ethanolamines in a state wherein the ethanolamines obtained are substantially colorless and transparent and without any offensive odor.

Other objects will become apparent from the following description.

These objects of the present invention are attained by adding to crude ethanolamines at least 0.01% by weight, based on the ethanolamines contained in the crude ethanolamines, of either powdered silicas, powdered silicates, liquid silicates or powdered aluminas, and thereafter carrying out the vacuum distillation of the mixture. While the functional mechanism of these additives are not fully known, it is perhaps due to their possession of some function by which they inactivate the aldehydes contained in the crude ethanolamines.

These additives according to the invention are those powdered or liquid compounds containing a major proportion of $SiO_2$ and/or $Al_2O_3$. Included are the powdered silicas such as activated clay, acid clay and silica gel, the powdered silicates such as talc, kaolin, powdered porcelain and silica-alumina gel, the liquid silicates such as water glass, and powdered aluminas such as activated alumina and alumina gel. These additives may be used singly or in combinations of two or more thereof. Since it is believed that the effects of this invention are brought about by the dissolution of the additives in the crude ethanolamines in a minute amount, preferably the powdered additives are those whose particle diameter is small. However, so long as they are such as can maintain a homogeneous mixed state with the crude ethanolamines during the distillation operation, there is no particular limitation and any can be used which normally come within the concept of a "powder."

These additives are added to the crude ethanolamines in a proportion of at least 0.01% by weight, based on the pure ethanolamines contained in the crude ethanolamines. At amounts less than this, the results are not conspicuous. Usually, additions in amounts ranging between 0.01 and 1% by weight are effective, a range between 0.02 and 0.1% by weight being particularly suitable. Amounts in excess of 1% by weight are also effective, of course, but no especial advantages accrue.

The additives may be added to the crude ethanolamines prior to their introduction to the distillation vessel or after the crude ethanolamines have been charged to the vessel. It is, of course, also possible to make replenishments of the additives during the distillation operation. In any event, instead of adding the additives in their powdered or liquid form, it is preferred that they be added in a paste or slurry state by kneading them in with a suitable amount of the ethanolamines containing at least 1% of water. The vacuum distillation procedure itself is the same as that customarily employed, it being possible to operate either batchwise or continuously using the conventional apparatus such as a simple still, a plate column or a packed column, and a pressure of about 100–1 mm. Hg and a temperature of 100–190° C.

The invention purification method can be effectively employed in purifying a mixture consisting of two or more of the crude ethanolamines of mono-, di- and triethanolamine, not to mention the purification of each these crude ethanolamines independently. Hence, it is possible, for example, to add the invention additives to a mixture containing crude mono-, di- and triethanolamine, then subjecting this mixture to vacuum distillation to distill off purified mono-, di- and triethanolamine from the tops of the first, second and third distillation column, respectively, and thereafter by again adding the additives to the respective overhead distillates and subjecting each separately to vacuum distillation to obtain mono-, di- and triethanolamine of still higher purity.

While the purification effect obtained by the use of the invention additives is remarkable regardless of whether it is mono-, di- or triethanolamine, it is especially marked in the case of triethanolamine. Namely, while it was only possible to obtain triethanolamine colored to a Hazen number of above 60 by means of the conventional purification method not using the invention additives, in accordance with the present invention, it is possible to obtain triethanolamine which is purified to the extent that its Hazen number is on the order of 10–20 (substantially colorless and transparent) and which has no offensive odor and moreover does not exhibit hardly any change with the passage of time.

In consequence, the high-grade ethanolamines purified by the invention method can be used to advantage in the pharmaceutical, cosmetic and various other fields.

For purpose of illustration only, this invention will now be illustrated by the following examples. Of course, this invention shall not be limited to the following examples.

EXAMPLE 1

A 2-liter stainless steel (SUS 27) distillation pot equipped with a thermometer was charged with 1.5 kg. of an ethanolamines mixture consisting of 10% water, 35% monoethanolamine, 30% diethanolamine and 25% triethanolamine. Separately, 400 mg. of commercially available activated clay powder were prepared into a paste by kneading with an ethanolamines mixture having a composition identical to that hereinabove described. This paste was then charged to the aforesaid distillation pot, after which the contents thereof were heated under reduced pressure using an electric flask heater, while introducing nitrogen by means of a hard glass capillary. The aforesaid activated clay was one containing about 60% of $SiO_2$ and 0–15% of $Al_2O_3$.

The distillate was taken out from the top of the pot, condensed using a customary condenser and then recovered. After first distilling off a fraction consisting predominantly of water, a fraction containing 95% of monoethanolamine and, besides this, diethanolamine was obtained under distillation conditions of a pressure of about 100 mm. Hg and a temperature of 120–130° C. The Hazen number of this fraction was 5. Next, under distillation conditions of a pressure of about 20–50 mm. Hg and a temperature of 150–160° C., a fraction containing 95% of dietahnolamine and, besides this, mono- and tri-ethanolamine was obtained. The Hazen number of this fraction was 10. Finally, under distillation conditions of a pressure of about 5 mm. Hg and a temperature of 185–187° C., a fraction containing 88% of triethanolamine, and besides this, chiefly diethanolamine was obtained. The Hazen number of this fraction was 20.

EXAMPLE 2

Vacuum distillation operations were carried out as in Example 1 using the same distillation pot and ethanolamines mixture as used therein exect that instead of the activated clay either powdered porcelain, silica-alumina gel, silica gel or the commercially available talc was used.

The results of measurements made of the Hazen number of triethanolamine fractions obtained with a pressure of 5 mm. Hg and a temperature of 185–187° C. are shown in Table I. By way of comparison, the result obtained when these additives were not used in also shown. The powdered porcelain used in this experiment had the following analytic composition.

| | Percent |
|---|---|
| $SiO_2$ | 70.14 |
| $Al_2O_3$ | 23.85 |
| $Fe_2O_3$ | 0.78 |
| CaO | 0.38 |
| MgO | 0.17 |
| $H_2O$ | 0.75 |

TABLE I

| Additive | Amount used, mg. | Hazen No. |
|---|---|---|
| Powdered porcelain | 400 | 15 |
| Silica-alumina gel | 500 | 20 |
| Silica gel | 300 | 20 |
| Talc | 400 | 20 |
| Not added | | 60 |

EXAMPLE 3

The vacuum distillation operation was carried out as in Example 1 using the same distillation pot and ethanolamines mixture as used therein except that the 400 mg. of activated clay was replaced with 250 mg. of powdered alumina. The foregoing powdered alumina was obtained by dropping ammonia water into an aqueous solution of aluminum nitrate to form aluminum hydroxide, which was then washed with dilute ammonia water and filtered, after which it was heated to 150° C. followed by drying and grinding to about 200 mesh.

After first distilling off a fraction consisting predominantly of water, a fraction containing above 95% of monoethanolamine and having a Hazen number of 5 was obtained at a pressure of about 20 mm. Hg and a temperature of 100–170° C. Next, at a pressure of about 2–6 mm. Hg and a temperature of 170–190° C., a fraction containing above 95% of diethanolamine and having a Hazen number of 10 was obtained. And finally, by maintaining this pressure and raising the temperature to above 190° C., a fraction containing above 85% of triethanolamine and having a Hazen number of 20 was obtained.

EXAMPLE 4

1.4 kg. of the ethanolamines mixture as used in Example 1 were subjected to vacuum distillation at a pressure of 20 mm. Hg in the same pot as used in Example 1, using, instead of the 400 mg. of activated clay used therein, 600 mg. of sodium silicate dissolved in a small amount of water. The results obtained are shown in Table II.

TABLE II

| Distillate | Bottom temperature at the time of distillation, ° C. | Hazen number |
|---|---|---|
| Monoethanolamine | 100–170 | (¹) |
| Diethanolamine | 170–200 | (¹) |
| Triethanolamine | 200–230 | 10 |
| Residual distillation liquid | | 40–50 |

¹ Not more than 5.

We claim:

1. A method of purifying ethanolamines to remove aldehyde impurities which comprises forming a mixture by adding to crude ethanolamines at least one material selected from the group consisting of powdered silicas, powdered silicates, liquid silicates and powdered aluminas, in an amount of 0.01–1.0 percent by weight, based on the ethanolamines contained in said crude ethanolamines, and thereafter subjecting said mixture to vacuum distillation.

2. A method of purifying ethanolamines to remove aldehyde impurities which comprises adding to a mixture of crude ethanolamines containing mono-, di-, and tri-ethanolamine at least one material selected from the group consisting of powdered silicas, powdered silicates, liquid silicate and powdered aluminas, in an amount of 0.01–1.0 percent by weight, based on the ethanolamines contained in said mixture of crude ethanolamines, and thereafter subjecting said mixture to vacuum distillation to distill off sequentially first a fraction containing predominantly monoethanolamine, then a fraction containing predominantly, diethanolamine and finally a fraction containing predominantly triethanolamine.

3. A method of purifying triethanolamine to remove aldehyde impurities which comprises forming a mixture by adding to crude triethanolamine at least one material selected from the group consisting of powdered silicas, powdered silicates, liquid silicates and powdered aluminas, in an amount of 0.01–1.0 percent by weight, based on the triethanolamine contained in said crude triethanolamine, and thereafter subjecting said mixture to vacuum distillation.

4. The method of claim 1 wherein said material is a powdered silica.

5. The method of claim 4 wherein said powdered silica is activated clay.

6. The method of claim 4 wherein said powdered silica is acid clay.

7. The method of claim 4 wherein said powdered silica is silica gel.

8. The method of claim 1 wherein said material is a powdered silicate.

9. The method of claim 8 wherein said powdered silicate is talc.

10. The method of claim 8 wherein said powdered silicate is powdered kaolin.

11. The method of claim 8 wherein said powdered silicate is powdered porcelain.

12. The method of claim 8 wherein said powdered silicate is silica-alumina gel.

13. The method of claim 1 wherein said material is a liquid silicate.

14. The method of claim 13 wherein said liquid silicate is water glass.

15. The method of claim 1 wherein said material is a powdered alumina.

16. The method of claim 15 wherein the powdered alumina is activated alumina.

17. The method of claim 15 wherein the powdered alumina is alumina gel.

References Cited

UNITED STATES PATENTS 2,950,319  8/1960  Schenck et al. _____ 260—582

OTHER REFERENCES

Meyer et al.: Chem. Abs. vol. 55, 1961, p. 10323 g.

CHARLES B. PARKER, *Primary Examiner.*

P. C. IVES, *Assistant Examiner.*

U.S. Cl. X.R.

203—36, 91; 260—584, 708